UNITED STATES PATENT OFFICE.

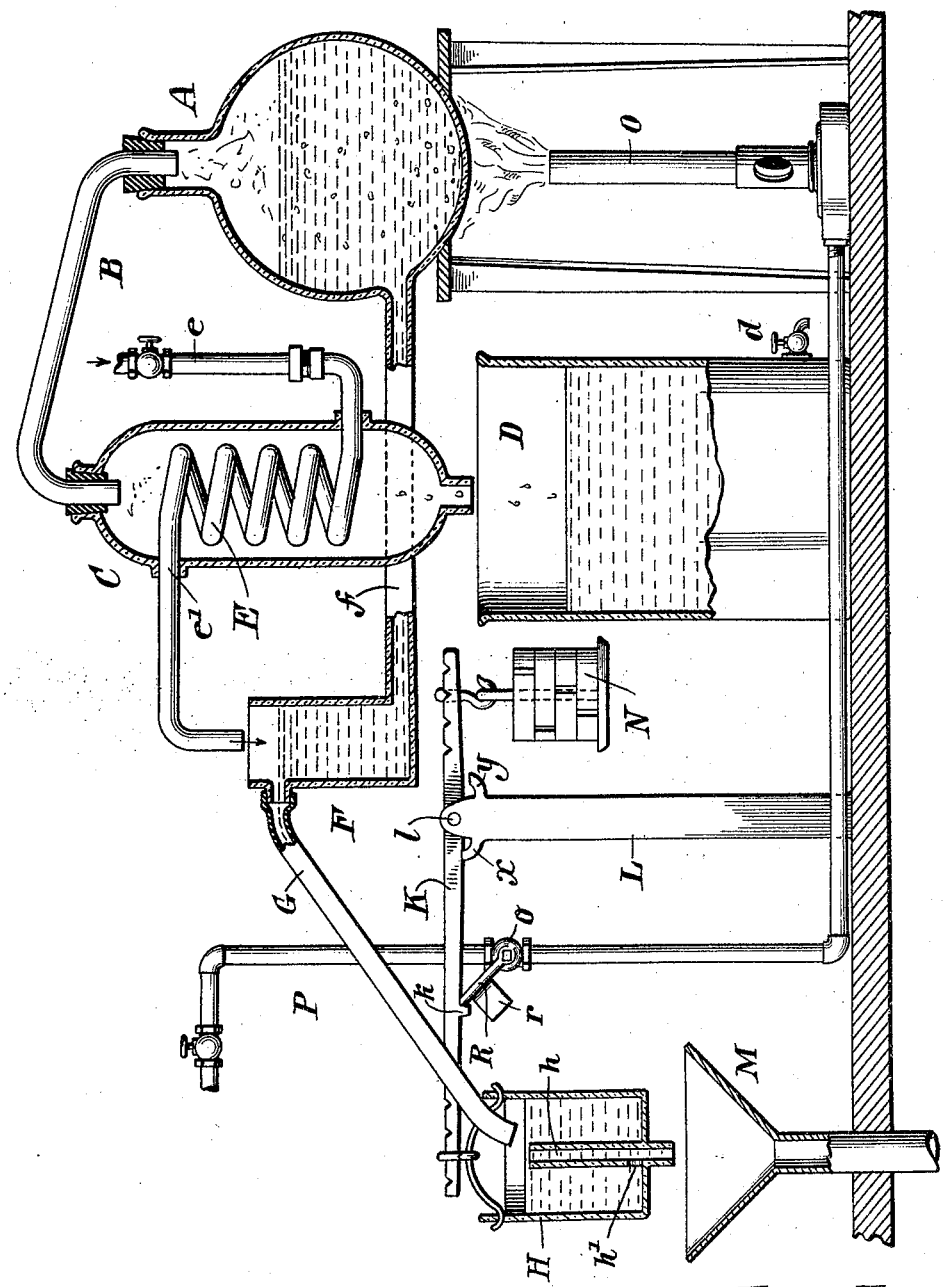

CHARLES EDMUND KELLS, OF NEW ORLEANS, LOUISIANA.

WATER-DISTILLING APPARATUS.

1,404,972.　　　　Specification of Letters Patent.　　Patented Jan. 31, 1922.

Application filed April 9, 1921. Serial No. 459,891.

*To all whom it may concern:*

Be it known that I, CHARLES EDMUND KELLS, a citizen of the United States, residing in New Orleans, in the parish of Orleans and State of Louisiana, have invented certain new and useful Improvements in Water-Distilling Apparatus, of which the following is a specification.

This invention relates to apparatus for distilling water, particularly for use of physicians, surgeons and dentists who require freshly distilled water from day to day or for constant use.

It is important that water for such purposes should be distilled in apparatus consisting largely of glass in preference to metal, as the distilled water is often used for injections and absolute purity in such cases is essential. Therefore, it is important that the water, while being distilled and after distillation, should not come in contact with metal. Stills of the general class to which my invention relates require constant watching in order that the water supply shall not fail because otherwise the glass flask, when such is employed, will be cracked, burned or broken by the heat of the burner unless the fuel supply is shut off.

In my U. S. Patent No. 1,366,465 of Jan. 25, 1921, and in my applications for patent No. 398,859, filed July 26, 1920, and No. 403,467, filed Aug. 14, 1920, I have shown apparatus so constructed as to automatically shut off the fuel supply when the water supply fails, or when the receiver for the distilled water is filled to the desired extent. Said prior patent and the two applications mentioned show different modifications of apparatus which may be used for this purpose. According to my present invention I have devised a new form of apparatus embodying certain improvements.

The improved apparatus is automatic in the control of the supply of the heating medium which is admitted to the burner for carrying on the operation as long as the water supply continues, but the construction is such that should the water supply fail or become insufficient the fuel supply will be at once automatically cut off so that breakage of any part of the apparatus from overheating is prevented. This is accomplished in the preferred way, by causing water from the water supply to pass to a flask or still and also to a vessel mounted on one end of a lever, the other end of which carries a weight. Said vessel is provided with an overflow pipe whereby the level in said vessel is normally kept constant, but the vessel is also provided with an exit by means of which the vessel may be drained and thus the weight of the vessel and its contents reduced. This causes the lever to be turned and said lever is connected with a valve in the fuel supply pipe which is automatically closed when the water supply fails or is unduly reduced. Other features of the invention will be hereinafter described.

The drawing shows, diagrammatically, an apparatus embodying my improvements.

A flask or still A is connected by a pipe B with a condenser C. The condenser delivers to a tank or other suitable receiving vessel D for distilled water which may be provided with a draw-off cock $d$, and contains a coil E. These parts A, B, C, D and E are preferably made of glass, for the reasons before stated.

Water enters the coil E through a pipe $e$ which may be connected to a tank or service pipe. After passing through the coil the water leaves the condenser at $e'$ and passes into a tank or vessel F, the bottom of which is connected by a pipe $f$ with the flask or still A. An overflow pipe G, which may be a rubber tube, is connected to the upper part of the tank F and empties into a balancing vessel H, carried by the outer end of a lever K, pivoted at $l$ to a suitable support L. The vessel H is arranged directly under the outlet of the pipe G and is provided with an overflow pipe $h$ which delivers to a sink M or other device for carrying off waste water. The position of the vessel H on the lever may be changed or adjusted in any suitable way. The opposite end of the lever K carries a weight or weights N.

Normally the vessel H is filled with water and normally this vessel, when thus filled, overbalances the weight N. An outlet $h'$ is formed in the lower part of the pipe $h$ and when the supply of water from the pipe G ceases the water runs out of the vessel H and the weight N overbalances said vessel.

The flask or still A is heated by a burner O, supplied by a pipe P. A valve $o$ in the pipe P is normally held open by an arm R which engages a lug $k$ on the lever K but the arm is weighted, as indicated at $r$, so that when the arm is disengaged from the lug $k$ the arm will turn and the valve will be closed and thus the supply of fuel will be cut off and danger of overheating the apparatus prevented.

In starting the operation the water supply is turned on and water is conveyed by the pipe *e* through the condenser to the vessel F which it fills and from this vessel the flask or still A is filled to the same level as the water in the vessel F. The supply of water to the vessel F is more than sufficient to supply the still and it overflows through the pipe G into the balancing vessel H which it fills to the top of the overflow pipe *h*. The supply is sufficient to normally provide an overflow through the pipe *h* and through the outlet opening *h'*. When thus started the water supply and the fuel supply are sufficient to continue the distilling operation. It will be observed that the vessel H holds the valve *o* open when said vessel is filled with water, but should the supply of water to the vessel fail or be unduly reduced, the tank will be drained through the exit opening *h'* which of course decreases the weight and therefore the weight N overbalances, the vessel H and the lever K is turned in such manner as to release the weighted arm R and the valve *o* in the fuel supply pipe is automatically closed. The movements of the lever arm may be controlled by stops *x*, *y*.

The apparatus herein shown and described differs from that shown in my application for Patent, No. 403,467, filed Aug. 14, 1920 in that a weight is supported on the lever K instead of the vessel which receives the distilled water. This construction has advantages in some cases. In the prior application just referred to the amount of distilled water received in the vessel is limited. When said vessel, which may be relatively small, is full the operation is stopped, but in the apparatus shown in the accompanying drawings and hereinbefore explained, a receiving vessel D for distilled water of unlimited capacity may be employed and the operation may continue indefinitely or until it is designedly stopped or the supply of water is unexpectedly arrested.

I have shown in the drawings a well known type of Bunsen burner supplied by gas, but other suitable heaters supplied with a different heating medium may be employed.

I claim as my invention:—

1. A distilling apparatus, comprising a still, a water supply, means for maintaining water at a constant level in the still, a condenser associated with the still, means for heating the still, a receiver for distilled water, a lever carrying on one end a counterbalancing vessel and on the other end a weight, means for conveying undistilled water from the water supply to the counterbalancing vessel, means for normally maintaining a predetermined level in said vessel, and means operated by the lever for shutting off the supply of the heating medium when the water supply fails.

2. A distilling apparatus, comprising a still, a water supply, a receiver for distilled water, a vessel receiving water from the water supply, a connection between said vessel and the still, an overflow from said vessel, a condenser associated with the still, a lever carrying on one end a weight and on the other a counterbalancing vessel which receives undistilled water from the water supply, an overflow pipe for said vessel, an exit opening near the lower end of said vessel whereby said vessel may be drained when the water supply fails, and means operated by the lever for cutting off the supply of the heating medium when there is a failure in the water supply.

3. A distilling apparatus, comprising a still, a water supply, means for maintaining water in the still at a constant level, a condenser associated with the still, means for heating the still, means for shutting off the supply of the heating medium a lever carrying a counterbalancing vessel on one end and an adjustable weight on the other end, means for conveying water from the water supply to the counterbalancing vessel, and means operated by the lever for shutting off the supply of the heating medium when the water supply fails or is diminished.

In testimony whereof, I have hereunto subscribed my name.

CHARLES EDMUND KELLS.